(12) United States Patent
Bao et al.

(10) Patent No.: US 8,219,100 B2
(45) Date of Patent: Jul. 10, 2012

(54) ACTIVE SERVICE REDIRECTION FOR A PRIVATE FEMTO CELL

(75) Inventors: Derek Hongwei Bao, Concord, CA (US); David Chiang, Fremont, CA (US)

(73) Assignee: Cellco Partnership, Basking Ridge, NJ (US)

( * ) Notice: Subject to any disclaimer, the term of this patent is extended or adjusted under 35 U.S.C. 154(b) by 1018 days.

(21) Appl. No.: 11/896,355

(22) Filed: Aug. 31, 2007

(65) Prior Publication Data

US 2009/0061873 A1    Mar. 5, 2009

(51) Int. Cl.
*H04W 36/00* (2009.01)
(52) U.S. Cl. ......... 455/444; 455/411; 455/436; 370/331
(58) Field of Classification Search .......... 455/436–444, 455/410–411, 432.1–433, 435.1–435.3, 445; 370/331–334
See application file for complete search history.

(56) References Cited

U.S. PATENT DOCUMENTS

| | | | |
|---|---|---|---|
| 5,513,184 A | 4/1996 | Vannucci | |
| 5,864,549 A | 1/1999 | Honkasalo et al. | |
| 5,974,308 A | 10/1999 | Vedel | |
| 6,101,176 A | 8/2000 | Hankasalo et al. | |
| 6,970,719 B1 | 11/2005 | McConnell et al. | |
| 2002/0032034 A1* | 3/2002 | Tiedemann et al. | 455/437 |
| 2002/0093921 A1* | 7/2002 | Urs et al. | 370/325 |
| 2002/0151308 A1 | 10/2002 | Baba et al. | |
| 2003/0017836 A1* | 1/2003 | Vishwanathan et al. | 455/517 |
| 2003/0109257 A1* | 6/2003 | Nilsson et al. | 455/436 |
| 2003/0148774 A1 | 8/2003 | Naghian et al. | |
| 2003/0231586 A1* | 12/2003 | Chheda | 370/230 |
| 2004/0204097 A1 | 10/2004 | Scheinert et al. | |
| 2005/0059390 A1 | 3/2005 | Sayers et al. | |
| 2006/0002355 A1* | 1/2006 | Baek et al. | 370/338 |
| 2006/0111110 A1 | 5/2006 | Schwarz et al. | |
| 2006/0160565 A1* | 7/2006 | Singh et al. | 455/554.1 |
| 2006/0215609 A1 | 9/2006 | Kyung et al. | |
| 2008/0009286 A1 | 1/2008 | Hur et al. | |
| 2008/0051088 A1* | 2/2008 | Tariq et al. | 455/436 |

OTHER PUBLICATIONS

U.S. Appl. No. 11/892,330, Bao, Derek Hongwei et al., "Femto-BTS RF access mechanism," filed Aug. 22, 2007.
U.S. Appl. No. 11/896,160, Chen, Xuming et al., "Pico cell home mode operation," filed Aug. 30, 2007.
International Search Report and the Written Opinion of the International Searching Authority issued in International Application No. PCT/US2008/072882 dated on Nov. 5, 2008.
Thadasina, N., "CDMA2000 1X Femtocell: Challenges Associated w/ Underlay Deployments," CDG Technology Forum, Dallas, Texas, May 2, 2007.

(Continued)

*Primary Examiner* — Meless N Zewdu
*Assistant Examiner* — Marcus Hammonds

(57) ABSTRACT

A femto cell at a customer premises, such as an IP-based femto Base Transceiver System (IP-BTS), can be configured as a "private access" node intended to service a limited set of mobile stations. However, mobile stations not associated with the private femto cell may acquire and lock onto the femto BTS. To avoid service blockages in such cases, the private femto BTS will allow call access attempts by, and call deliveries to, a non-associated mobile station, despite the "private access" configuration. However, upon completion of call setup, the non-associated mobile station is directed to initiate handoff, from the private femto cell coverage provided by the femto BTS into a cell coverage of a base station of the macro network, to conserve femto cell resources for use in servicing calls of the associated mobile station(s).

15 Claims, 4 Drawing Sheets

OTHER PUBLICATIONS

International Search Report and the Written Opinion of the International Searching Authority issued in International Patent Application No. PCT/US2008/072886 dated on Nov. 5, 2008.

"WCDMA Ubicell Benefits," http://www.samsungnetwork.com, retrieved Jul. 18, 2007.

Thadasina, "CDMA2000 1X Femtocell Challenges Associated w/Underlay Deployments," CDG Technology Forum, Dallas, Texas, May 2, 2007.

"Femto Cells: Personal Base Stations," Airvana, Chelmsford, MA, Jul. 12, 2007.

"Samsung Introduces CDMA Base Station for Home Coverage at CTIA," Samsung Telecommunications America, LLC, Mar. 26, 2007.

"Your own mobile base station for home," inbabble.com, Feb. 10, 2007.

* cited by examiner

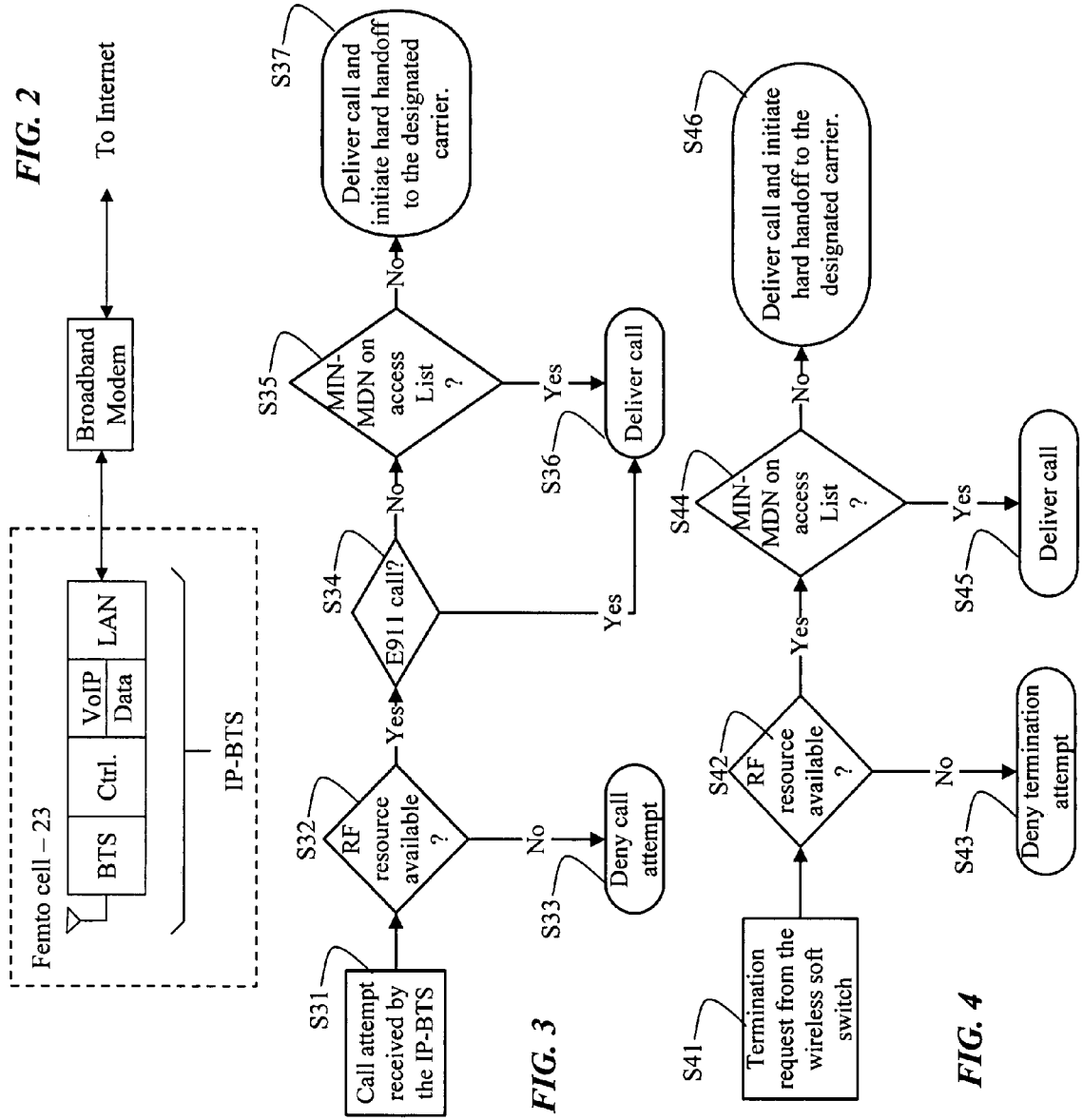

ACTIVE SERVICE REDIRECTION FOR A PRIVATE FEMTO CELL

TECHNICAL FIELD

The subject matter disclosed herein relates to techniques and equipment for the redirection of call access attempts by, or call delivery attempts to, a mobile station that has inadvertently acquired a "private access" femto cell base transceiver system with which the mobile station is not associated.

BACKGROUND

In recent years, use of mobile communications devices for voice telephone services, email or text messaging services and even multi-media services has become commonplace, among mobile professionals and throughout the more general consumer population. Mobile service provided through public cellular or PCS (personal communication service) type networks, particularly for voice telephone service, has become virtually ubiquitous across much of the world. In the USA, for example, competing public networks today provide mobile communications services covering most if not all of the geographic area of the country.

In addition to public networks, similar wireless technologies have provided relatively small scale networks for enterprise applications, typically offering wireless service analogous to private branch exchange (PBX) type service. Such a smaller scale private system includes several base stations, similar to but scaled down from those used in the public networks, in combination with a private circuit switch or more recently an Internet Protocol (IP) router or network, for providing communications between devices and with external networks. U.S. Pat. No. 6,970,719 to McConnell et al. and US application publication no. 2005/0059390 to Sayers et al. disclose examples of such private wireless cell phone networks. Although sometimes referred to as an "indoor cellular network" or "indoor system," such enterprise systems need not be literally indoors and for example may offer coverage across an entire campus area. Alternatively, such an enterprise cellular communication system may be referred to as a "pico-cell" system, with the outdoor public cellular communication system covering a wider area being referred to as a "macro-cell" system.

As broadband IP connectivity to homes and offices has become more common, and the speeds of packet-switched communications equipment and the speed of processors have increased, a variety of applications have emerged that utilize IP packet transport as an alternative bearer for voice communications. Generally, such applications are referred to as voice-over-packet services, however, the common forms based on Internet Protocol (IP) are referred to as "Voice over IP" or "VoIP" services. Although originally developed for wireline network transport through the Internet and through wireline intranets, VoIP services are now migrating to the wireless domain. For example, pico cell systems, which use IP routing or frame switching for IP transport, utilize VoIP technology to support the voice services.

As an extension of these developments/deployments into the customer premises, particularly for residential or small business applications, equipment manufacturers have recently begun offering "femto" cell devices, e.g. for home installation. A "femto" cell system includes a small scale base transceiver system (BTS) for wireless communication with mobile stations, so as to operate compact base station. In recent examples, the BTS has VoIP capability and an IP interface, for example, for connection to a digital subscriber line (DSL) modem or to a cable modem. If it includes VoIP capability and an IP interface, the femto base station may be referred to as an "IP-BTS." One femto cell unit in a home or small business would allow mobile station users in or around the premises to make and receive calls. If the femto cell is an IP-BTS type device the calls would use the existing broadband wireline service from the customer's Internet Service Provider (ISP).

It has been suggested that the deployment of femto cells will be particularly advantageous to a carrier as a way to improve mobile communication service of the carrier's macro network in customer premises locations where the macro network service is less than optimum. For example, if a mobile station user may have weak coverage at his or her residence, installation of a femto cell in the home effectively extends macro network coverage into the home in a manner that substantially improves the customer's experience using the carrier's network.

At present, plans therefore are for the carrier(s) to distribute (sell or lease) the femto cell equipment to their public macro network customers. The femto cell is intended to work with a regular mobile station. To the mobile station, the BTS of such a femto cell appears like a normal base station of the public network. Deployment of femto cells, particularly in large numbers of customer premises, requires coordination with networks of the applicable public carriers, which raises issues for such a carrier.

Femto cell products are deployed in customer locations as an underlay system. They are designed to have the same attributes as the macro network, to create a seamless network for customers. Since these femto cells for residential or small business deployments have limited resources for providing service, the carrier may offer the femto cell customers the ability or option to designate their devices as "private" access points for a predefined list of associated mobile stations. When so configured, all other mobile stations will be denied service under the coverage of these privatized femto BTS devices. However, based on RF conditions, any mobile station may lock-onto a private BTS of a femto cell, but the mobile station will not be aware that it can not obtain service through that BTS, because the femto BTS otherwise appears as a public device to the mobile station. Under such a circumstance, a mobile station that is not on the list of customer-approved stations for the private femto BTS may be locked onto that BTS, but because the mobile station is not associated with the femto cell for private access, the femto BTS will block service for calls to/from the network for that non-associated mobile station. Such conditions disrupt service for other regular customers of the mobile service provider when those mobile stations conduct an idle-handoff into these private BTS devices given their proximity and RF conditions. Therefore, a need exists for a technique to gracefully handle these mobile devices that are "foreign" to the private femto BTS, without blocking services to the foreign mobile stations, while maintaining the security and resource management of the privately designated femto BTS equipment.

SUMMARY

The teachings herein produce improved results, over the prior systems discussed above, by providing a technique to allow call set-up through a 'private' femto cell for a non-associated or foreign mobile station but then force a handoff of the call session from private femto cell coverage to macro network coverage.

For example, a disclosed method processes a call for a mobile station configured for operation through base stations of a macro wireless communication network when the mobile station attempts a call via a femto cell that has been designated as a private femto. The method entails receiving a request to set-up a call session for the mobile station through the private femto cell. In response, a determination is made as to whether or not the mobile station is one associated with the private femto cell and thus is permitted to obtain service through the private femto cell. The method involves initiating establishment the requested call session for the mobile station through the private femto cell, despite a determination that the mobile station is not associated with the private femto cell, i.e. is not designated to receive service through the private femto cell. However, upon successful establishment of the requested call session for the non-associated mobile station through the private femto cell, the mobile station is automatically directed to initiate a handoff of the call session from the private femto cell to a base station of the macro wireless communication network, which effectively forces the call session out of private femto cell coverage into macro network coverage.

A system offering mobile communications services for mobile stations, which may implement this technique, includes a macro network providing wireless public mobile communications services in a region and femto cell base transceiver systems installed in premises within the region. The macro network includes base stations providing wireless communications, a base station controller coupled to the base stations for controlling mobile station handoff operations through the base stations and a mobile switching center for routing mobile station calls via the base stations. The femto cell base transceiver systems provide wireless communications with mobile stations, e.g. in and/or around respective premises. However, one of the femto cell base transceiver systems is configured as a private femto cell, for servicing one or more of the mobile stations indicated as associated with the one femto cell base transceiver system. The system also includes a switch coupled for communication with the femto cell base transceiver systems and coupled for communication with the mobile switching center of the macro wireless network. The switch, for example, controls calls through the femto cell base transceiver systems including handoff of calls. As part of its control functions, the switch will allow set-up of a call session for a non-associated mobile station through the base transceiver system of the private femto cell, but it will then direct the mobile station to initiate a handoff of the call session from the femto cell base transceiver system of the private femto cell over to one of the base stations of the macro communication network, to force the call session out of private femto cell coverage into macro network coverage.

In the disclosed example, femto cells are IP-BTS type devices, although other types of femto cells could be used. In each exemplary femto cell, the BTS connects to an IP interface, and the femto cell has VoIP capability. The IP interface provides communications for mobile stations that utilize the femto cell via a wide area packet data network, typically the Internet. In such a deployment, the switch is a wireless soft switch coupled to the data network for communication with the IP-BTS type femto cells.

In such an example, when there is a call to or from a foreign mobile station, the wireless soft switch transmits a command through the private femto cell to the mobile station, instructing the mobile station to initiate a hard handoff of the call session from the private femto cell to the base station of the macro wireless communication network. The handoff instruction may direct the non-associated mobile station to a macro frequency that is different from the frequency or frequencies used by the femto cells. The wireless soft switch, in this architectural example, also provides associated signaling to the macro network elements, e.g. the base station controller and/or the mobile switching center, to facilitate the hard hand of the established call into the macro network.

Examples of the call processing discussed below include techniques for handling outgoing calls, from the non-associated mobile station and calls coming in for the non-associated mobile station. In some cases, it may be desirable to further refine the logic of handling of calls for a non-associated mobile station through a private femto cell. For example, the system may be configured to allow the call (without handoff) if the call is an emergency call, such as from the mobile to 911. Also, before allowing call set-up for the non-associated mobile station, it may be desirable first to confirm that there are adequate RF resources available through the private base station, so that set-up of the call session for that station will not adversely impact service to the mobile station(s) that may be associated with the private femto cell.

The result of the disclosed techniques is to avoid blockage of service to a valid mobile station that my inadvertently lock onto a private femto cell with which it is not associated. However, by promptly handing the call off to the macro network, the femto cell BTS is allowed to focus mainly on its private service to its associated mobile station(s). Handing the call off to a different frequency also reduces the likelihood that the mobile station will revert to idling under coverage of the femto cell soon after the end of the call.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a simplified functional block diagram of a femto cell IP-BTS and an associated modem providing broadband Internet connectivity.

FIG. 3 is a simplified flow chart useful in understanding the logic involved in handling an outgoing (origination) call from the premises through a private femto cell.

FIG. 4 is a simplified flow chart useful in understanding the logic involved in handling an incoming (termination) call directed to a mobile station through the private femto cell.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various equipment and processing techniques disclosed herein relate to an approach to handling of calls through a "private" femto cell by or for a non-associated or "foreign" mobile station, which reduce or eliminate service blockages yet may allow most operations of the private femto cell to be limited to services provided for any associated mobile station(s). In the equipment and processing examples discussed below, the private femto BTS will allow call access attempts by, and call deliveries to, a non-associated mobile station, despite the "private access" configuration of the particular femto cell. However, upon completion of call set-up, the non-associated mobile station is directed to initiate a handoff, from the private femto cell coverage provided by the femto BTS into a cell coverage of a base station of the macro network, to conserve femto cell resources needed for servicing calls of the associated mobile station(s).

Figure 1:
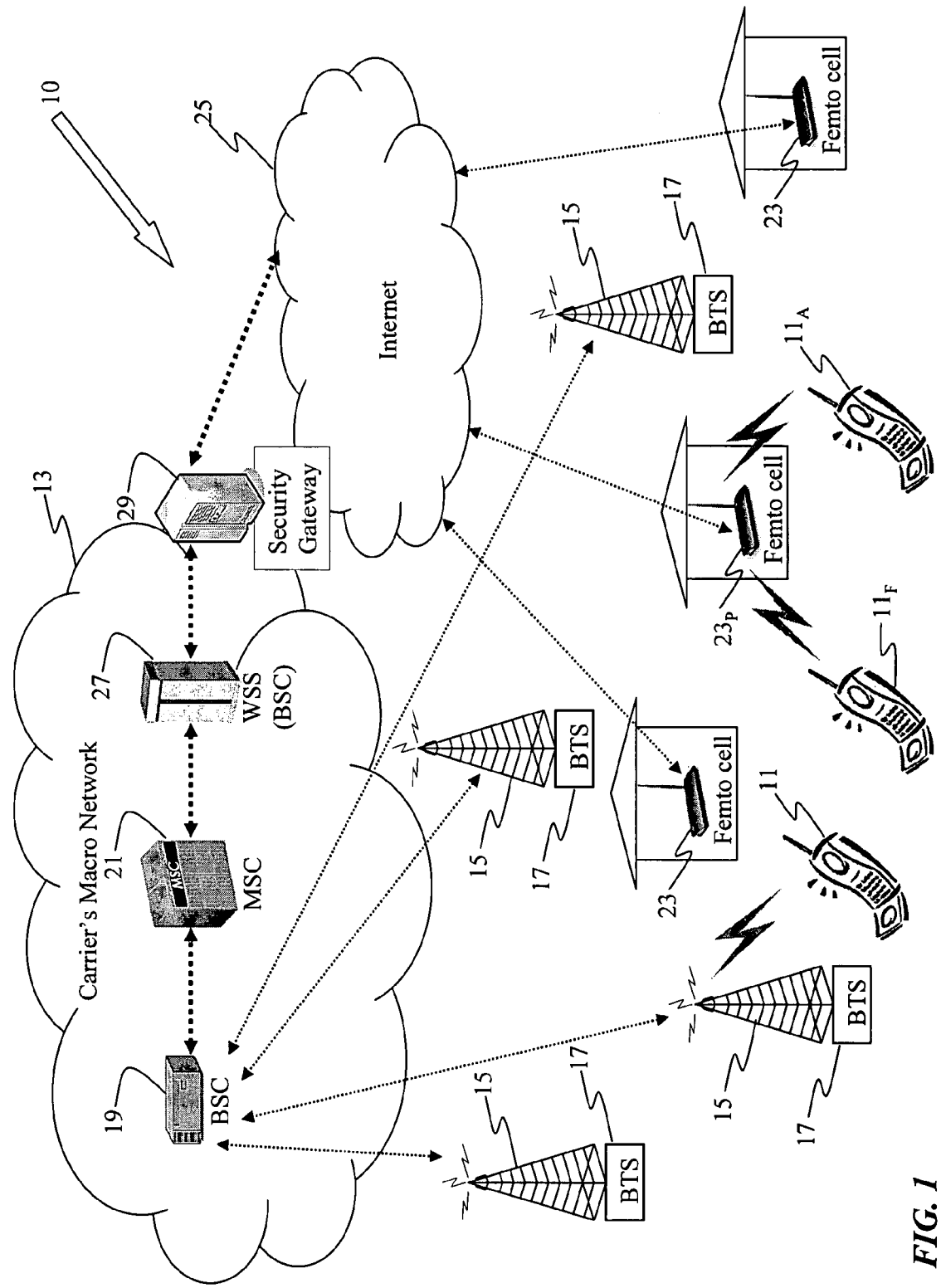
FIG. 1 is a simplified functional block diagram of a mobile wireless communication network, including a macro network, several femto cells and elements providing service via a femto cell to a mobile station in the vicinity of the customer premises.

Reference now is made in detail to the examples illustrated in the accompanying drawings and discussed below. FIG. 1 is a functional block diagram of a system 10 for providing wireless communication services for mobile stations 11, using both macro cell public network equipment and femto cell equipment at customer premises locations. In the example, a carrier operates the macro cell network 13 and provides mobile stations 11 to its customers, i.e. so that the mobile station users obtain wireless communication services through the macro network 13.

Although the present concepts are applicable to other types of networks, the exemplary network 13 is a CDMA type network. The carrier also supplies femto cell equipment to some of its customers, for customer premises deployments. The femto cell equipment corresponds in type to the equipment of the macro cell network 13. Hence, in our example, the femto cell equipment is configured for CDMA communication over the airlink with CDMA mobile stations 11.

The carrier may also operate some additional equipment to support femto cell communications (such as a switch for controlling calls through the femto cells). In the example, the system associated with or operated by the carrier includes the macro network 13, the customers' mobile stations 11, the femto cells and any of the carrier's equipment that supports the femto cell communications. The carrier's system may utilize or communicate through other networks or systems not owned, operated or affiliated with the carrier or its system (s) or network(s), such as the public switched telephone network (PSTN) or the public Internet.

In many areas today, one or more wireless service providers or carriers operate a macro network 13, to provide wireless mobile communications services over a radio airlink for mobile stations 11. Typically, such a macro network uses a 'cellular' architecture. A carrier providing service throughout the country will operate similar networks in various geographic regions. In some countries, particularly in the USA, a number of carriers operate two or more such networks and compete for providing services to mobile customers. For convenience, the example shows one such macro network 13, as a carrier might deploy equipment to serve a given geographic region or area.

For discussion purposes, the example shows a limited number of the elements of the carrier's macro network 13. Hence, in the example, the carrier operates a number of base stations 15, a base station controller (BSC) 19 and a mobile switching center (MSC) 21, to provide mobile wireless communication services to mobile stations 11 operating within areas or regions served by the radio coverage of the individual base stations 15. Each base station (BS) 15 typically includes an antenna system represented as a tower in the drawing and an associated base transceiver system (BTS) 17. The BTS 17 communicates via the antennae of the base station and over the airlink with the mobile stations 11, when the mobile stations are within range.

The MSC 21 handles call routing and may provide a variety of related special services for mobile stations 11. Today, most versions of the MSC 21 provide circuit switched communications to/from mobile stations 11 and other networks or elements, although newer MSC switching systems are being deployed that utilize packet switching technologies. Each wireless service provider's network typically includes a BSC 19 that controls the functions of a number of base stations 15 and helps to manage how calls made by each mobile station 11 are transferred (or "handed-off") from one serving base station to another. Each wireless network equipment vender implements this function differently. Some vendors have a physical entity, which they call a base station controller like the BSC 19 shown in the drawing, while other vendors include this functionality as part of their switch that forms the MSC 21. Each service provider's facilities may offer somewhat different services, e.g. voice call, text messaging, data or various combinations of these and other services. Also, the service providers will have different agreements in place as to how to treat each others' subscribers when roaming through the various networks.

In the example, the carrier's macro network 13 offers voice telephone service for and between mobile stations 11. Although not shown, those skilled in the art will recognize that such telephone service also includes voice calls between mobile stations and landline telephones through the PSTN. Most modern networks also offer a variety of text and data services, although for ease of discussion, the example here focuses mainly on voice services.

The carrier operating the network 13 will also offer in-home or customer premises services via femto cell equipment. The carrier may lease or sell the equipment to any number of its customers in the area served by the macro network 13. Hence, the illustration shows several homes or other premises having femto cells 23. Although other small scale base stations may be used, as shown in FIG. 2, the exemplary femto cell equipment comprises an IP-BTS. Such a device includes a base transceiver system (BTS) for radio communications and an associated controller function (Ctrl.), which generally controls operation of the femto cell. The femto cell BTS transceiver and associated controller are generally similar to equipment used in a public network base station, although the femto cell versions are scaled down for customer premises use. Over the airlink, the BTS will appear identical to a CDMA type public or macro network BTS, except for the power level and possibly the particular one of the licensed frequency bands on which the macro and femto BTSs operate. An example of a CDMA implementation of an IP-BTS is the UbiCell product by Samsung.

Since the mobile stations and the interfaces/protocols used over the airlink are the same as used in the macro network, the communications may not be compatible with direct IP transport. Hence, the exemplary IP-BTS also includes one or more interworking or protocol conversion functions for voice and/or data. For voice, for example, the IP-BTS will provide two-way conversions between the voice data format used by the mobile stations and BTSs and a Voice over IP (VoIP)

packet format. The interworking functions may be implemented by processing on the processor hardware that implements the controller (Ctrl.) for the IP-BTS.

The IP-BTS further includes a packet communication interface. Although other arrangements or interface types are possible, the example uses a local area network (LAN) interface, for providing packet communication with the customer's broadband modem. The modem, for example, may be a digital subscriber line (DSL) or cable modem. The present concepts also encompass arrangements that utilize wireless or fiber transport for IP packet services. Through the modem, the LAN interface provides two-way IP packet communication (e.g. for VoIP) with a wide area packet data communication network, for the mobile communications through the IP-BTS. In the example of FIGS. 1 and 2, the wide area network is the public Internet 25, although private networks may be used.

Returning to the discussion of the overall system 10 of FIG. 1, each customer premises having a femto cell 23 will have a link to a packet data network, in this example the Internet 25 (provided by a broadband modem or the like as shown in FIG. 2). The carrier also operates a switch for controlling calls through femto cells 23. The switch may provide actual routing or switching but will at least control certain operations related to calls through the femto cells. The structure and/or logic and/or the type of switch will be selected for compatibility with the particular type of BTS equipment used for the femto cells 23. In the example, to manage wireless calls via the IP-BTS type femto cells 23, the carrier will also operate a server or other platform 27 providing a soft switch functionality. The wireless soft switch (WSS) 27 will appear as another mobile switching center to the MSC 21, e.g. via appropriate signaling and traffic communication links commonly used among MSCs. However, the WSS 27 communicates with the femto cells via IP packet transport through the Internet 25. To facilitate such communications, the carrier may also operate a gateway 29, to provide security between the carrier's own private IP facilities that communicate with the wireless soft switch 27 and the public Internet 25.

As for communications through the macro network elements, the carrier will provide a base station controller (BSC) functionality for calls going through the femto cells 23. This BSC functionality controls the functions of a number of IP-BTS type femto cell base stations, for example, to manage how calls to/from a mobile station 11 are transferred (or "handed-off") from one serving base station to another. The BSC for femto cell calls could be implemented in the IP-BTS equipment, or it could be implemented as a separate physical entity analogous to the BSC 19 of the macro network 13. In the illustrated implementation, however, the WSS type soft-switch for femto cell call processing, also performs functions of the BSC such as handoff control between various base stations.

Femto IP-BTS devices are typically deployed in localized customer locations such as homes, small offices, etc. to compliment macro network coverage offered by a public mobile service provider or carrier. The customer has a choice of making the IP-BTS "public," i.e. accessible by any mobile station of any customer of the particular carrier; or as a private "access point" for the customer's predefined list of mobile devices. Any mobile device that performs idle-handoff into a femto IP-BTS will register through the BTS with the WSS 27, in a manner analogous to registering with the macro network base stations 15 and MSC 21. When so registered through a femto cell 23, the mobile station 11 will have the ability to idle under femto cell coverage.

Many of the femto cells 23 may be operated in a public mode. In such a mode, assuming resources are currently available through the particular femto cell 23, any valid mobile station 11 can send or receive a call through the femto cell 23. However, these femto cells for residential or small business deployments have limited resources for providing service. Hence, the femto cell equipment has the capacity (e.g. it can be configured) to operate is a "private access" mode. In our example, assume that the customer owns or leases the femto cell $23_P$ has opted to have that femto cell configured as a private access point. In this configuration, the customer can provide a predefined list of associated mobile stations to which the femto cell $23_P$ will provide access. The list of associated mobile stations could be stored in the controller of the IP-BTS of the femto cell $23_P$, but in the example, the list is stored and acted upon by the WSS 27.

For purposes of an example, the drawing shows an associated mobile station $11_A$ of a Home User of the private femto cell $23_P$. The station may be any mobile station 11 compatible with the CDMA operations of the macro network 13 and the femto cells 23. However, identification information for the associated mobile station $11_A$, such as its Mobile Directory Number (MDN) and/or its Mobile Identification Number (MIN) are stored in the predefined list of associated mobile stations for the private femto cell $23_P$. In operation, the femto cell $23_P$ will provide the mobile station $11_A$ with wireless service through the Internet 25 and the WSS 27, when the station $11_A$ is within range. However, the intent of the private configuration is to minimize or avoid servicing other non-associated mobile stations such as the foreign mobile station $11_F$ in our example.

Thus, when private home designation is in effect, a femto cell IP-BTS attempts to adapt its RF power to cover the "Home Users" associated with the private femto cell $23_P$, while minimizing spill over coverage to "Foreign Users." Achieving an optimal RF coverage may not always be possible since there is always a possibility for mobile station $11_F$ of a foreign user to idle under the femto IP-BTS' coverage. In such a case, the foreign user—a legitimate customer of the carrier—may be denied service.

However, based on RF conditions, any mobile station may lock-onto a BTS of a private femto cell $23_P$. In our example, based on relative RF conditions as between the private femto cell $23_P$ and the base stations 15 of the macro network 13, we will assume that the mobile station $11_F$ has locked onto the BTS of the private femto cell $23_P$. However, the foreign mobile station $11_F$ is not aware of the private configuration of the femto cell $23_P$. The techniques disclosed herein avoid blockage of service to the mobile station $11_F$ by allowing a call for that station to be initiated through the private femto cell $23_P$, but the techniques conserve resources of that femto cell for the associated mobile station(s) $11_A$ by forcing a handoff of each such foreign station call as soon as possible, e.g. to free-up any femto cell resources that otherwise would have been tied-up by the foreign mobile station call.

The exemplary solution to the problem of how to gracefully handle a foreign mobile station that has inadvertently locked onto a private IP-BTS, involves allowing initial call set-up through the private femto IP-BTS and a subsequent hard handoff of the call to a base station 15 of the a macro network 13 where the BTS 17 of the macro base station 15 operates on a different frequency, i.e. a frequency not used by the IP-BTS devices of the femto cells 23. To appreciate such operations, it may be helpful to first summarize handoff operations in a mobile communication network.

In normal operations, for example, in a CDMA network, the network determines a need for a handoff and upon that determination sends a handoff command to the mobile station. Upon receipt of a handoff command, the mobile station releases its communication session through the old base station handling the active cell and initiates a new session for handling of that call via assigned channel resources of the new base station.

In CDMA cellular telecommunication systems, a handoff is usually accomplished via a "soft handoff" between sectors or from one base station to another base station. In a soft handoff, the mobile station is in communication with more than one base station simultaneously, and thus the mobile station performs a "make before break" transition from one base station to another base station. The soft handoff is possible because in CDMA cellular telecommunication systems, numerous mobile stations communicate with each base station on the same frequency channel, each mobile station having a unique spreading code for distinguishing the information signals broadcast by the numerous mobile stations. Thus, when a mobile station moves from one CDMA cell to another CDMA cell, the same frequency is used in each CDMA cell and the unique spreading code identifies the mobile station to the new base station.

However, handoffs between systems, e.g. between systems of different service providers, between systems using different technologies (e.g. between CDMA and AMPS, TDMA or GSM systems) or between systems using different frequency bands, a "hard handoff" occurs. The hard handoff is a "break before make" connection. The hard handoff may be necessary because the available frequency channels or the encoding technologies used in the two adjoining systems differ, and thus when a mobile station moves from one to another, a new frequency channel or coding technique must be implemented.

Many handoff decisions are based on mobile station determinations of signal quality from various base stations, such as measurements of signal strength. However, handoff decisions may utilize other logic. Of note for purposes of this discussion, mobile stations and network equipment also support system or network directed hard handoff. Essentially, a network element such as the BSC 19 transmits an instruction through the serving BTS 17 and over the airlink to the mobile station 11 directing the mobile station to conduct a hard handoff to another designated base station 15, e.g. to a neighboring base station that is controlled by a different BSC 19 and/or is operating on a different frequency or frequency band. The BSC 19 may also provide signaling to the target base station or its BSC, to facilitate successful completion of the hard handoff.

We have devised an algorithm to gracefully handle foreign mobile stations' outgoing and incoming calls. The algorithm is essentially a best effort attempt to deliver the call based on available RF resources. A network directed hard handoff technique mechanism is used to address the issues with regard to calls for foreign mobile stations $11_F$ through private femto cells $23_P$. In the illustrated system 10, the network (e.g. the WSS 27 through the femto cell $23_P$) will direct an immediate hard handoff, from a private femto cell $23_P$ to a macro layer base station 15 on a different frequency, in the event a call for a mobile station $11_F$ goes through a "private" femto cell $23_P$ with which the mobile station $11_F$ is not affiliated (the mobile station is "foreign"). This approach also diminishes the potential for the foreign users to remain idling under the femto IP-BTS and hence be locked in this undesirable situation.

FIGS. 3 and 4 depict aspects of exemplary logic that may be applied to calls for a foreign mobile station $11_A$ through a private femto cell $23_P$. The femto IP-BTS equipment in a given area will operate on a frequency band normally used for CDMA operation, although it may be different from the bands used in the particular area. Within its operating band, the IP-BTS can operate on one or more of several frequency channels (defined by corresponding carrier frequencies). Of those channels, one channel is designated as a "primary" channel, and all of the IP-BTS equipment will provide at least a beacon on the designated primary channel, to facilitate acquisition, e.g. idle state handoff to, the femto cells 23. The femto IP-BTS can be operating at the primary carrier frequency for its communications with the mobile stations, or the IP-BTS can be operating at any other carrier frequency with a pilot beacon at the primary carrier frequency, to direct a mobile station to the applicable operating frequency channel of the IP-BTS.

In the examples of FIGS. 3 and 4, the "Private" home designation is turned on in the IP-BTS of the private femto cell $23_P$, and a Home User access list has been created for the particular IP-BTS. The list could be stored and utilized in the controller of the IP-BTS, however, in the example, the list is stored in the WSS 27. One or more associated Home User mobile stations $11_A$ and a Foreign User mobile station $11_F$ are registered with the WSS (wireless soft switch) $23_P$ through the IP-BTS (FIG. 2) of femto cell $23_P$ (FIG. 1). A hard handoff destination carrier is defined by the WSS 27, based on local macro network configuration. This handoff destination may be defined as any carrier that is neither the current operating carrier of the femto IP-BTS nor the femto primary carrier (Primary carrier is defined by market).

FIG. 3 shows the logic for a call from the foreign mobile station $11_F$. In the example, the mobile station $11_F$ provides signaling to the BTS to make a call, which the IP-BTS receives as call attempt signaling at S31 in the drawing. If no RF resources are available, then the call will be denied. Hence, step S32 involves a determination of availability of RF resources through the IP-BTS of the private femto cell $23_P$. If sufficient RF resources are unavailable at the time of the attempt, e.g. tied-up in one of more calls for associated mobile stations $11_A$, the processing branches to step S33 in which the femto cell $23_P$ denies the call attempt.

For a call origination (out-bound) case, if RF resources are available, the IP-BTS of the femto cell $23_P$ will deliver emergency calls (E911) regardless whether the calling device is that of a Home User or a Foreign User. Of course, on a call origination attempt, the IP-BTS of the femto cell $23_P$ will deliver calls from an associated mobile station $11_A$. In the exemplary logic, step S34 involves a determination of whether or not the call is an emergency call, and step S35 involves a determination of whether or not the call is from an associated mobile station $11_A$. In step S34, the WSS 37 examines dialed digits to determine whether or not the calling device is making an emergency call. Essentially, in step S35 the WSS 27 will compare identification data from the originating mobile station 11, such as its MIN or MDN, to the access list of mobile stations authorized to communicate through the particular private femto cell $23_P$. The Yes branches from steps S34 and S35, either in the event that the caller dialed an emergency number or the calling station is listed as an authorized mobile station $11_A$, both go to step 36 in which the IP-BTS of the femto cell $23_P$ delivers the call as dialed by the calling mobile station.

However, if the No condition occurs in steps S34 and S35, that means the call is not an emergency call and is from a foreign mobile station $11_F$ (not an associated mobile station $11_A$ whose MIN or MDN is in the access list), and the processing flows through steps S34 and S35 to step S37. In step S37, the IP-BTS of the private femto cell $23_P$ will deliver the call as dialed. However, in S37, unlike S36, the IP-BTS will initiate a hard handoff of the foreign station call from the private femto cell $23_P$ to the macro network 13 at the specified destination carrier frequency.

For a call termination (in-bound) case, when the WSS 27 receives a call termination request to a mobile device that is not in the Home User access list, if RF resources are available, the femto IP-BTS will deliver the call and initiate a hard handoff to the macro network at the specified destination carrier frequency. If no RF resources are available, then the WSS will deny the call and forward the call to secondary treatment (i.e. voice mail).

Hence, in the exemplary logic of FIG. 4, the WSS 27 receives a request (at S41) to complete a call directed to a mobile station 11 through the IP-BTS of the private femto cell $23_P$, because the idle mobile station has registered through that femto cell. As noted, both associated mobile stations $11_A$ and non-associated foreign mobile stations $11_F$ may register with a femto cell 23, including with a private femto cell $23_P$. As a result of the registration, the WSS 27 has informed the macro network 13 of the current point of attachment for the particular mobile station 11, and the macro mobile network 13 and the WSS 27 can direct an incoming call for the mobile station to the appropriate femto cell 23, that is to say to the private femto cell $23_P$ in the examples under discussion here.

In response to receiving the termination request (at S41), the BSC functionality in the WSS 27 will first determine the availability of RF resources through the IP-BTS of the private femto cell $23_P$ (step S42). If sufficient RF resources are unavailable at the time of the attempt, the processing branches to step S43 in which the call termination attempt is denied. However, if resources are available, then processing branches from step S42 to step S44.

In the exemplary logic, step S44 involves a determination of whether or not the call is directed to an associated mobile station $11_A$. Essentially, the WSS 27 will compare identification data (e.g. MIN and/or MDN) for the destination mobile station 11 to the access list of mobile stations authorized to communicate through the particular private femto cell $23_P$. If the destination station is an associated mobile station $11_A$ identified in the access list, processing at S44 branches to step S45, in which the called is delivered to the authorized mobile station $11_A$ through the private femto cell $23_P$, in the normal manner. However, if the destination station is not identified on the access list, then the processing at step S44 branches to step S46. In step S46, the IP-BTS of the private femto cell $23_P$ will deliver the call to the destination station, which at this point in our example is a foreign mobile station $11_F$. However, in S46, unlike S45, the WSS 27 causes the IP-BTS to instruct mobile station $11_F$ to initiate a hard handoff of the foreign station call from the private femto cell $23_P$ to the macro network 13 at the specified destination carrier frequency.

In both outgoing and incoming call processing examples, the triggering of hard handoff redirects the foreign station call to a designated carrier or frequency channel, which is different from the carrier or carriers of the femto BTS. As noted, a plurality of predefined channels are available for IP-BTS femto operation. Each IP-BTS may be configured somewhat differently, but each IP-BTS will provide at least a pilot beacon on one of those channels that is designated as the primary channel for femto cell operations. Stated another way, the IP-BTS equipment is capable of operating on one or more of a plurality of channels. Each IP-BTS in turn is configured to operate a pilot beacon on a primary one of a predefined set of channels and operate for communication purposes on another of those channels indicated by the pilot beacon or to operate for full communication purposes on the primary channel. The handoff command directs the mobile station $11_F$ to handoff to a designated carrier that is a valid operating carrier frequency of the macro network 13 and is market specific. The designated carrier frequency is not the primary or operating frequency for the femto cell $23_P$. In most instances, the designated carrier frequency is not one of the predefined channels for femto cell operation in the region. It can be in a different band class as well. This mechanism of moving the foreign mobiles $11_F$ away from the primary and/or operating carrier frequencies of the femto IP-BTS equipment serves to diminish the chances for foreign mobile stations $11_F$ to perform idle-handoff back into the femto IP-BTS and idling within its coverage again.

Figure 5:
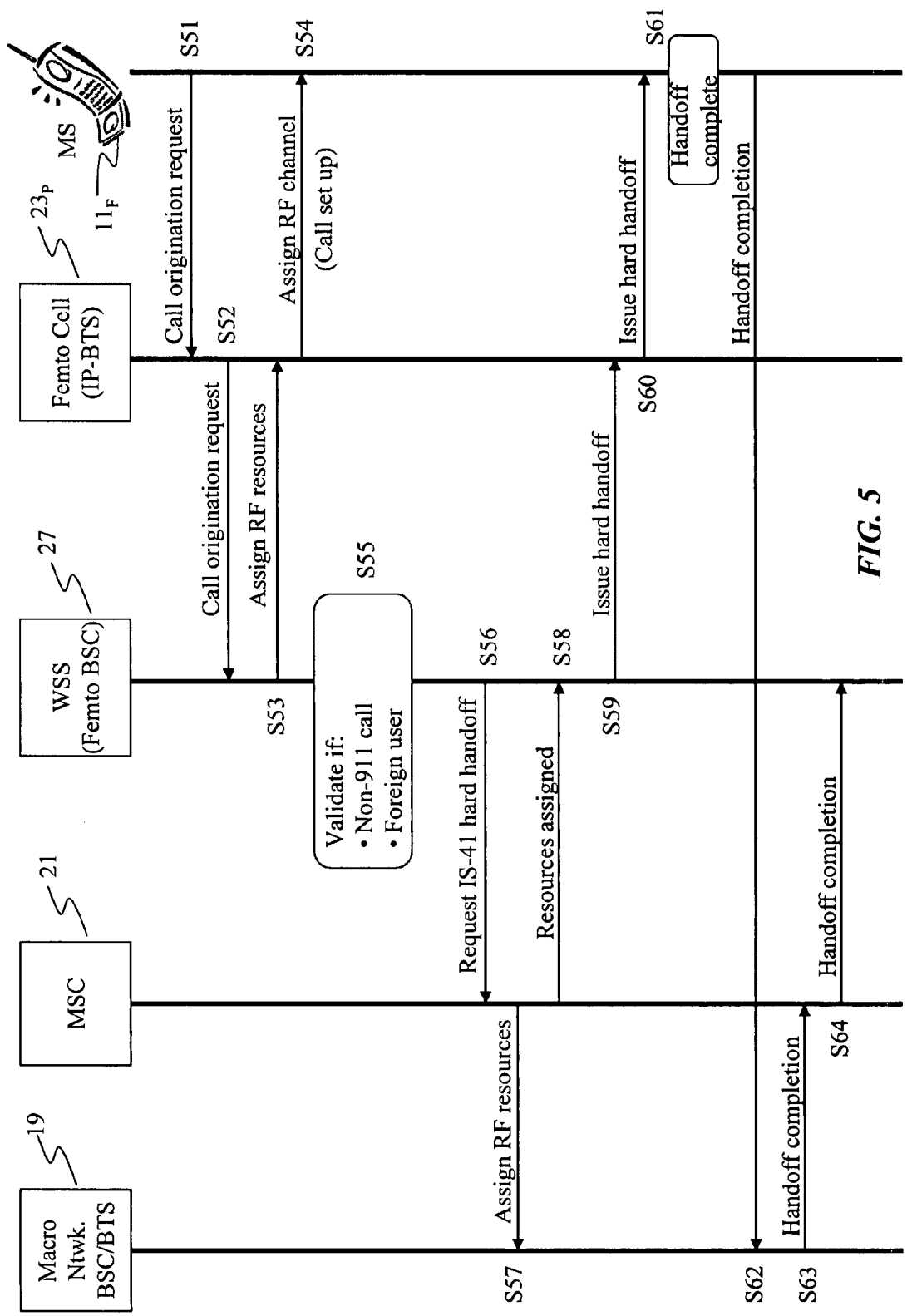
FIG. 5 is a simplified signal flow diagram illustrating processing of a call from a non-associated mobile station, through a private femto cell.
Figure 6:
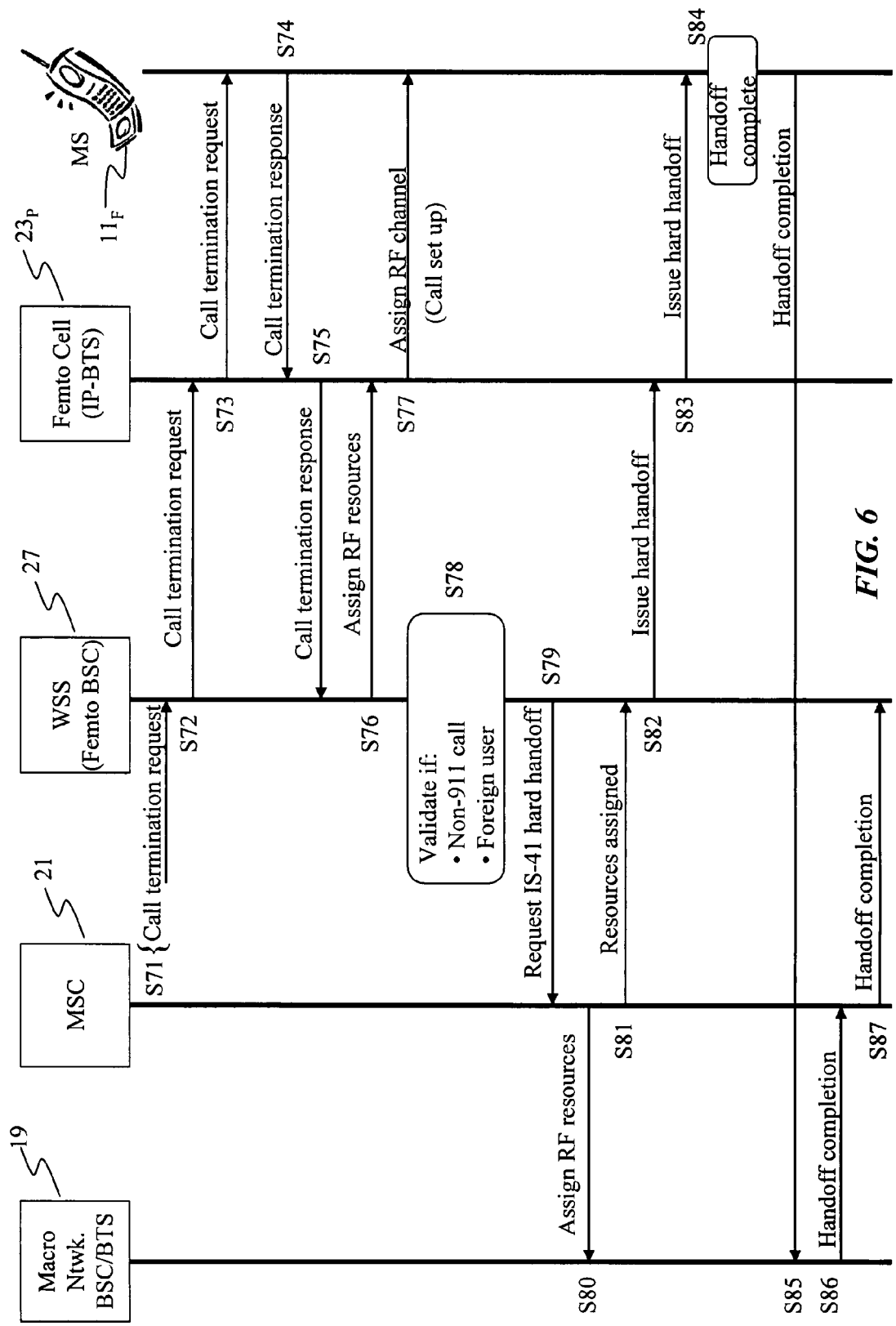
FIG. 6 is a simplified signal flow diagram illustrating processing of a call directed to a non-associated mobile station at the premises, through a private femto cell.

With that high-level discussion of the call processing logic, it may be helpful now to consider more specific examples of the signaling flow involved in processing calls for a foreign mobile station $11_F$ through a private femto cell $23_P$. In that regard, FIG. 5 shows the originating or outgoing call flow example, whereas FIG. 6 shows the terminating of incoming call flow example. In both cases, we will assume that the foreign mobile station $11_F$ has locked onto the BTS of the private femto cell $23_P$. Although the principles under consideration here may apply to other types of mobile station calls or sessions, for discussion purposes here we will assume that the calls are telephone type calls for voice communications or the like. The number of signaling messages have been condensed and the traffic communication flows have been omitted from the examples to simplify the drawings and the discussion below.

With reference to FIG. 5, the outgoing call processing begins with signaling from the foreign mobile station $11_F$ to the IP-BTS of the private femto cell $23_P$ requesting origination of a call (S51). The IP-BTS of the femto cell $23_P$ sends the call origination request, in this case via the Internet 25, to the WSS 27 (S52). Assuming that the mobile station $11_F$ is a valid device and RF resources are available, the WSS 27 sends an instruction back to the IP-BTS of the femto cell $23_P$ instructing the IP-BTS to assign RF resources (S53). The IP-BTS of the femto cell $23_P$ sends a message over the airlink instructing the mobile station $11_F$ to use the assigned RF link resources for its communications with the IP-BTS for the requested call (S54). This essentially sets-up the call through the IP-BTS and through the Internet with the WSS 27.

In this example, the call processing logic for determining the type of call (emergency or not) and the type of mobile station (associated $11_A$ or foreign $11_F$) is implemented in the WSS 27. At this point (S55) in our example of FIG. 5, the WSS 27 determines that the call is not an emergency call but that it does originate from a mobile station $11_F$ that is that of a foreign user (not associated with the particular private femto cell $23_P$). Hence, at step S56, the WSS 27 sends an IS-41 request for a handoff into the macro network 13, to the MSC 21 of the macro network 21. The MSC 21 causes the network elements such as the BSC 19 and the macro BTS to assign RF resources (S57) and informs the WSS 27 of the assigned RF resources (step S58), e.g. including the designated carrier frequency.

The WSS 27 then sends an instruction to the IP-BTS of the private femto cell $23_P$ to initiate hard handoff (S59), and the IP-BTS performs protocol conversions if necessary and forwards that command over the arilink to the mobile station $11_F$ (S60). The command, for example, indicates the frequency channel of the base station 15 to which the mobile station $11_F$ should initiate handoff. The mobile station $11_F$ will go through a series of steps to complete a handoff of the call into the base station coverage on the indicated frequency channel, using standard handoff procedures, as represented collectively by the step S61 in FIG. 5. When the handoff is complete after step S61, the mobile station sends a message indicating handoff completion, which goes to the BSC 19 in the macro network (S62). The BSC 19 in the macro network in turn informs the MSC 21 that handoff is complete (S63), and the MSC 21 confirms handoff completion to the WSS 27 (S64).

We will now consider an incoming or terminating call example, with reference to FIG. 6. Although a number of steps may be involved when another party initiates a call from another station (not shown), the call signaling will be forwarded to the WSS 27 in view of the registration of the mobile station $11_F$ via one of the femto cells 23. Hence, the discussion of our example begins with receipt of a call termination request (S71), for the mobile station $11_F$, at the WSS 27. Based on an earlier idle state handoff/registration procedure, the WSS 27 is aware that the mobile station $11_F$ is locked onto the private femto cell $23_P$ and accessible through the IP-BTS of that femto cell. Assuming that the mobile station is a valid device and resources are available, in response to the termination request at S71, the WSS 27 sends a call termination request message through the Internet to the appropriate femto cell $23_P$ (S72). In response, the IP-BTS of that femto cell performs standard over-the-air signaling with the mobile station $11_F$ to request call termination to that device as represented by the step S73. If the called mobile station accepts the incoming call, the mobile station $11_F$ sends back an affirmative call termination response as shown generally at step S74, and the IP-BTS forwards that response back to the WSS 27 as shown at S75.

In response to the call termination response, the WSS 27 sends back an instruction to the IP-BTS of the femto cell $23_P$ instructing the IP-BTS to assign RF resources (S76). The IP-BTS of the femto cell $23_P$ sends a message over the airlink instructing the mobile station $11_F$ to use the assigned RF link resources for its communications with the IP-BTS for the incoming call (S77). This essentially sets-up the call through the IP-BTS and through the Internet and the WSS 27. Although the link to the calling station is not separately shown, the two-way communication session between the mobile station $11_F$ and the calling station may be completely set-up at this stage of the process.

As in the previous example, the call processing logic for determining the type of call (emergency or not) and the type of mobile station (associated $11_A$ or foreign $11_F$) is implemented in the WSS 27. At this point (S78) in our example of FIG. 6, the WSS 27 determines that the call is not an emergency call but that it does originate from a mobile station $11_F$ that is that of a foreign user (not associated with the particular private femto cell $23_P$). Hence, at step S79, the WSS 27 sends an IS-41 request for a handoff into the macro network 13, to the MSC 21 of the macro network 21. The MSC 21 causes the network elements such as the BSC 19 and the macro BTS to assign RF resources (S80) and informs the WSS 27 of the assigned RF resources (step S81), including the designated carrier frequency.

The WSS 27 then issues an instruction to the IP-BTS of the private femto cell $23_P$ to initiate hard handoff (S82), and the IP-BTS performs protocol conversions if necessary and forwards that command over the arilink to the mobile station $11_F$. The command, for example, indicates the frequency channel of the base station 15 to which the mobile station $11_F$ should initiate handoff. The mobile station $11_F$ will go through a series of steps to complete a handoff of the call into the base station coverage on the indicated frequency channel, using standard handoff procedures, as represented collectively by the step S84 in FIG. 5. When the handoff is complete after step S84, the mobile station sends a message indicating handoff completion, which goes to the BSC 19 in the macro network (S85). The BSC 19 in the macro network in turn informs the MSC 21 that handoff is complete (S86), and the MSC 21 confirms handoff completion to the WSS 27 (S87).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

BS—Base Station
BSC—Base Station Controller
BTS—Base Transceiver System
CDMA—Code Division Multiple Access
DSL—Digital Subscriber Line
IP—Internet Protocol
IP-BTS—Internet Protocol-Base Transceiver System
ISP—Internet Service Provider
MDN—Mobile Directory Number
MIN—Mobile Identification Number
MS—Mobile Station
MSC—Mobile Switching Center
PBX—Private Branch Exchange
PCS—Personal Communication Service
PSTN—Public Switched Telephone Network
RF—Radio Frequency
SIP—Session Initiation Protocol
VoIP—Voice over Internet Protocol
WSS—Wireless Soft Switch

What is claimed is:

1. A method of processing a call for a mobile station operable through base stations of a macro wireless communication network via a private femto cell at premises of a customer of the macro wireless communication network, wherein:
the private femto cell comprises a small scale base transceiver system (BTS) for radio communications with the mobile station in the same manner as a base station of the macro wireless communication network and an interface for packet communication with a switch of the macro wireless communication network via a broadband wireline communication service serving the customer premises,
the method comprising steps of:
receiving a request to set-up a call session for the mobile station through the private femto cell;
determining that the mobile station is not a station associated with the private femto cell permitted to obtain service through the private femto cell; and
upon determining that the mobile station is not associated with the private femto cell:
(1) initiating establishment of the requested call session for the non-associated mobile station through the private femto cell; and
(2) upon successful completion of establishment of the requested call session for the non-associated mobile station through the private femto cell, forcing the established call session for the non-associated mobile station out of the private femto cell into macro network coverage while the non-associated mobile station is within range of the private femto cell, by automatically directing the non-associated mobile station to initiate a handoff of the established call session from the private femto cell to a base station of the macro wireless communication network.

2. The method of claim 1, wherein the step of directing the mobile station to initiate handoff comprises transmitting a command via the private femto cell to the mobile station, instructing the mobile station to initiate a hard handoff of the established call session from the private femto cell to the base station of the macro wireless communication network.

3. The method of claim 1, wherein the step of directing the mobile station to initiate handoff comprises transmitting a command via the private femto cell to the mobile station, instructing the mobile station to initiate a hard handoff of the established call session to a designated frequency channel of the base station of the macro wireless communication network.

4. The method of claim 3, wherein:
the private femto cell is configured to operate on one or more of a plurality of predefined frequency channels; and
the frequency channel of the base station of the macro wireless communication network designated for the hard handoff is different from the predefined frequency channels.

5. The method of claim 1, wherein the step of initiating establishment of the requested call session for the non-associated mobile station through the private femto cell comprises:
determining whether or not sufficient resources are available through the private femto cell to handle set-up of the requested call session for the mobile station; and
initiating establishment of the requested call session for the mobile station through the private femto cell, upon determining that sufficient resources are available through the private femto cell to handle set-up of the requested call session.

6. The method of claim 1, further comprising:
determining whether or not the requested call session relates to an emergency call from the mobile station;
wherein the determining that the mobile station is not associated with the private femto cell is responsive to a determination that the requested call session does not relate to an emergency call from the mobile station.

7. The method of claim 1, wherein the requested call session relates to a call from the non-associated mobile station to a destination station.

8. The method of claim 1, wherein the requested call session relates to a call from an originating station intended for completion to the non-associated mobile station.

9. A system offering mobile communications services for mobile stations, the system comprising:
a macro network providing wireless public mobile communications services in a region, the macro network comprising base stations providing wireless communications with the mobile stations, a base station controller coupled to the base stations for controlling mobile station handoff operations through the base stations and a mobile switching center for routing calls for mobile stations via the base stations;
femto cells installed in premises within the region, for wireless communications with mobile stations, wherein:
each femto cell comprises a small scale base transceiver system (BTS) for radio communications with mobile stations in the same manner as a base station of the macro network and an interface for packet communication with the macro network via a broadband wireline communication service serving the customer premises,
one of the femto cells is configured as a private femto cell for servicing one or more of the mobile stations indicated as associated with the base transceiver system of the private femto cell;
a switch coupled for packet communication with the femto cells and coupled for communication with the mobile switching center of the macro wireless network, the switch being configured to control calls through the femto cells including handoff of calls, the call control by the switch including functions of:
receiving a request to set-up a call session for an identified mobile station through the femto cell base transceiver system of the private femto cell;
determining that the identified mobile station is not associated with the private femto cell; and
upon determining that the identified mobile station is not associated the base transceiver system of the private femto cell:
(1) initiating establishment the requested call session for the identified mobile station through the base transceiver system of the private femto cell and through the switch; and
(2) upon successful completion of establishment of the requested call session through the base transceiver system of the private femto cell and through the switch, forcing the established call session for the non-associated mobile station out of the private femto cell into macro network coverage while the non-associated mobile station is within range of the private femto cell, by automatically directing the identified mobile station to initiate a handoff of the established call session from the base transceiver system of the private femto cell to one of the base stations of the macro communication network.

10. The system of claim 9, wherein:
the base transceiver system and interface of each femto cell form an Internet Protocol-Base Transceiver System (IP-BTS); and
the switch is configured to communicate with the IP-BTSs using Internet Protocol (IP) communications.

11. The system of claim 10, wherein the switch comprises a wireless soft switch coupled for communication with the femto cells through a data.

12. The system of claim 11, wherein the wireless soft switch is configured to communicate with the IP-BTSs using IP communications through the Internet.

13. The system of claim 9, wherein:
the base stations of the macro communication network comprise CDMA equipment configured for wireless communication with the mobile stations in accord with a code division multiple access wireless protocol; and
the base transceiver systems of the femto cells comprise CDMA equipment configured for wireless communication with the mobile stations in accord with said code division multiple access wireless protocol.

14. The system of claim 9, wherein:
the function of the switch to automatically direct the identified mobile station to initiate a handoff of the established call session comprises transmitting a command from the base transceiver system of the private femto cell to the identified mobile station, instructing the identified mobile station to initiate a hard handoff of the established call session from the private femto cell to the base station of the macro communication network; and the switch also provides signaling to the macro network to facilitate the hard handoff of the established call session to the base station of the macro communication network.

15. The system of claim 9, wherein:

the femto cell base transceiver systems are configured for operating on one or more channels selected from a plurality of predefined channels for femto cell communications; and the function of the switch to automatically direct the identified mobile station to initiate a handoff of the established call session comprises transmitting a command from the base transceiver system of the private femto cell to the identified mobile station, instructing the identified mobile station to initiate a handoff to a frequency channel of the base station of the macro communication network that is not one of the predefined channels for femto cell communications.

* * * * *